B. F. TUSSING.
MECHANISM FOR ASSORTING FRUIT BY WEIGHT.
APPLICATION FILED SEPT. 10, 1919.
1,349,304.
Patented Aug. 10, 1920.
2 SHEETS—SHEET 1.
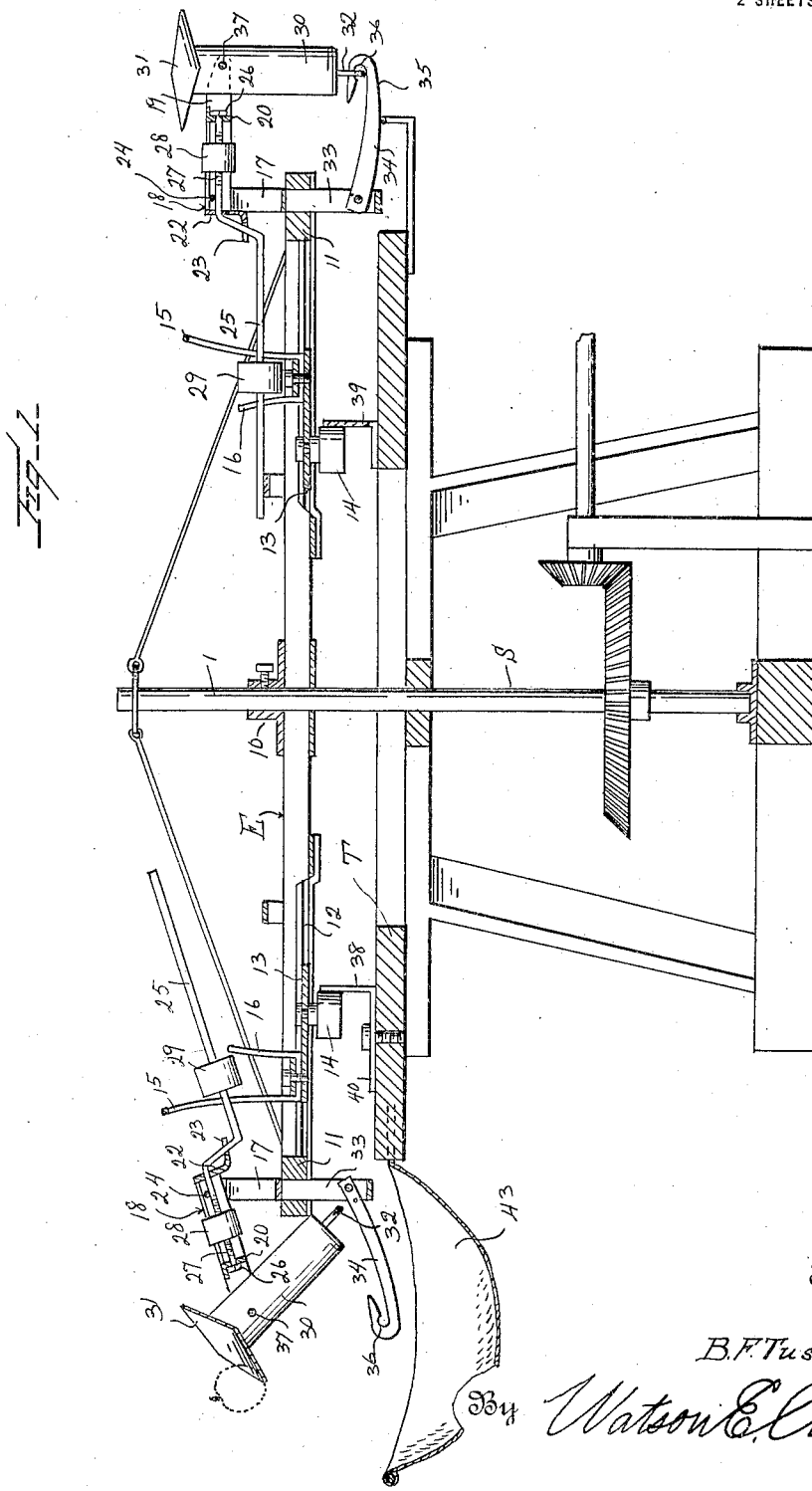
Inventor
B. F. Tussing
By Watson E. Coleman
Attorney

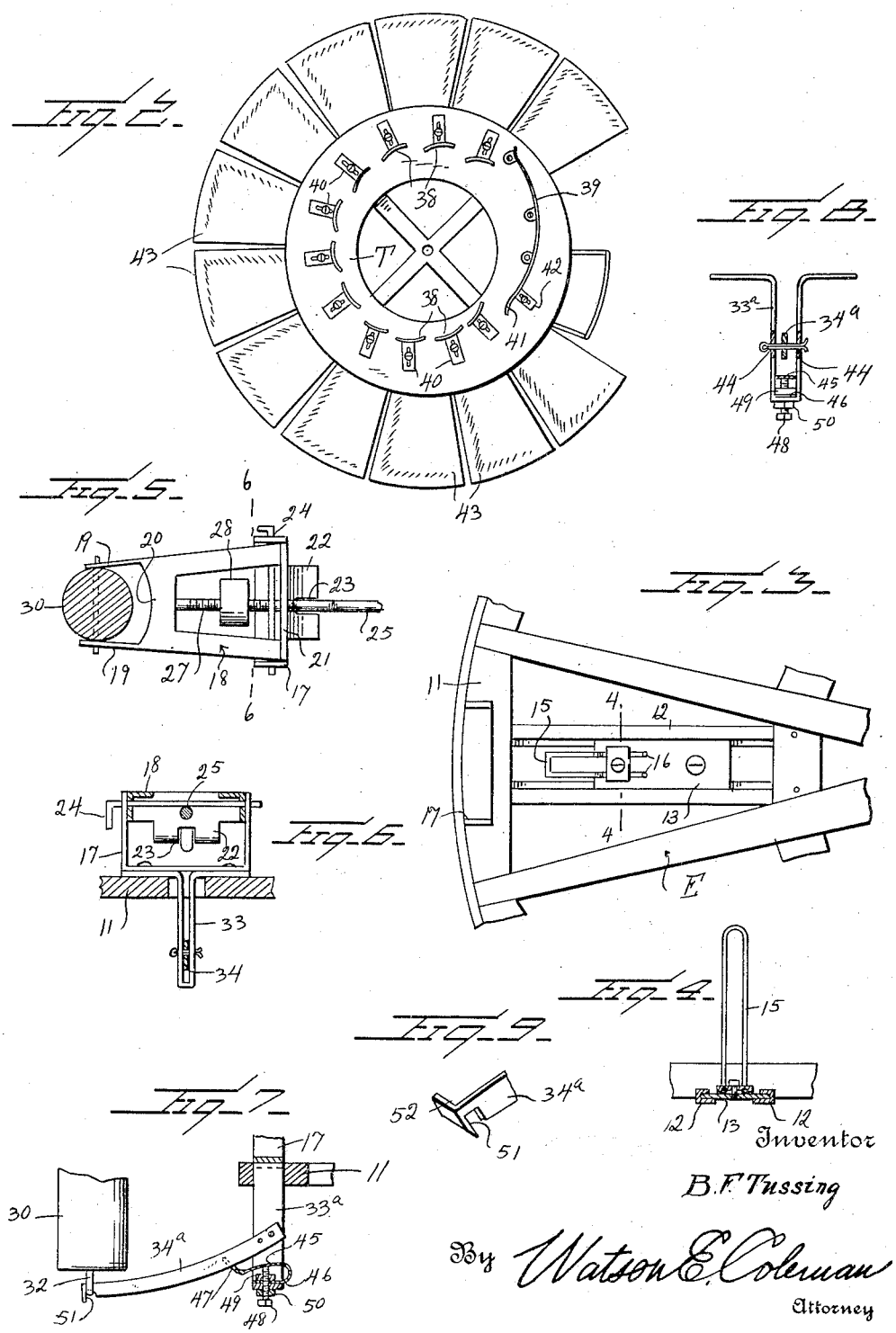

UNITED STATES PATENT OFFICE.

BENJAMIN F. TUSSING, OF FRUITLAND, IDAHO.

MECHANISM FOR ASSORTING FRUIT BY WEIGHT.

1,349,304.   Specification of Letters Patent.   Patented Aug. 10, 1920.

Application filed September 10, 1919. Serial No. 322,847.

*To all whom it may concern:*

Be it known that I, BENJAMIN F. TUSSING, a citizen of the United States, residing at Fruitland, in the county of Payette and State of Idaho, have invented certain new and useful Improvements in Mechanism for Assorting Fruit by Weight, of which the following is a specification, reference being had to the accompanying drawings.

This invention relates to devices for sorting fruit or other articles by weight, and particularly to certain improvements on the weight assorting mechanism illustrated in my Patent, No. 1,219,056, granted on March 13, 1917, on a sizing machine.

In this patent, I illustrated a rotatable table having thereon a plurality of weighing beams, each carrying a pan to receive an apple, peach, or other fruit, with a shiftable counterweight mounted on each beam, and means for shifting the counterweight of each beam inward. The table rotated until the weight of the fruit would counter-balance the counterweight and cause the pan to discharge the fruit into a receptacle.

The general object of the present invention is to improve upon this construction, and particularly to provide a mechanism which will weigh the fruit more accurately, and, therefore, secure a better assorting of the fruit according to weight.

A further object is to provide a weighing mechanism which will drop more quickly when the poise has been shifted to a position where it tends to counter-balance the fruit and thus prevent the fruit from being carried from one bin to another while the beam is tipping.

And a further object is to provide a construction which is simpler than that illustrated in my prior patent and less costly.

A further object is to provide a construction of this character wherein the pan will not only sink under the weight of the fruit but wherein the pan will likewise tilt when the beam sinks so as to quickly discharge the fruit from the pan.

A further object is to provide means which will prevent the tipping of the pan except in one direction to discharge the fruit, and which will prevent the tipping of the pan unless the beam is dropped.

A further object is to provide improved means for accurately adjusting the beam to prevent its tipping except under a predetermined weight.

Other objects will appear in the course of the following description.

My invention is illustrated in the accompanying drawings, wherein:—

Figure 1 is a vertical sectional view of a sorting machine constructed in accordance with my invention, showing my improved weighing device applied thereto;

Fig. 2 is a top plan view of the table T showing the arrangement of the cams thereon;

Fig. 3 is a fragmentary top plan view of a portion of the rotatable element E;

Fig. 4 is a section on the line 4—4 of Fig. 3;

Fig. 5 is a fragmentary plan view of one of the scale beams showing the member 30 in section;

Fig. 6 is a section on the line 6—6 of Fig. 5;

Fig. 7 is a fragmentary sectional view of a modified form of detent;

Fig. 8 is a front elevation of the link 33$^a$, the detent being shown in section;

Fig. 9 is a fragmentary perspective view of the forward end of the detent 34$^a$.

Referring to these drawings, E designates a wheel rotatably mounted upon a shaft 1 which is driven in any suitable manner. This rotatable table or wheel is of any construction and provided with a hub 10 and a ring 11, and supported at intervals on this wheel are the parallel, approximately radially extending guide strips 12. Mounted between each pair of guide strips 12 is a slide 13 carrying a depending roller 14 and also carrying the upwardly extending, looped finger 15 and the upwardly and rearwardly extending fingers 16. Mounted upon the rim of the wheel, that is upon the extremities of the strips 12, is an upwardly extending, U-shaped yoke 17 and pivotally supported upon this yoke is a sheet metal frame 18 constructed to provide two arms 19, angular in cross section, and an angular cross strip 20 intermediate the ends of the arms. Those portions of the arms projecting beyond the cross strip or brace 20 have their horizontal flanges cut away. The rear ends of the arms are transversely connected by an apertured member 21 having the downwardly and rearwardly extending tongue 22 which is slotted, as at 23. A pivot pin 24 passes through the upwardly extending ears of the yoke 17 and through the rear ends of the arms 19. This frame 18 constitutes a portion of a scale beam. The other part of the scale beam consists of a rod 25 which extends slightly through the aperture in the cross piece 20 and is provided with a nut 26 at this end and extends rearward from this cross piece 20 through the cross bar 21 and then extends downward and rearward through the slot 23 and then extends horizontally rearward. That portion of this rod between the cross piece 21 and the cross piece 20 is screw-threaded, as at 27.

Mounted on this screw-threaded portion is an adjustable poise 28 which, by rotating it, may be shifted toward or from the pivotal axis of the scale beam. Mounted upon the horizontal inner portion of each rod 25 is a sliding counterweight or poise 29. The loop-like finger 15 extends over the rod 25 and is disposed in front of the shiftable weight 29, while the fingers 16 extend upward behind the weight on each side of the rod. It will, therefore, be seen that the shifting of the slide 13 will cause the fingers 15 and 16 to shift this weight or poise 29 along the rod 25.

Pivoted between the forward extensions of the arms 19 is a cylindrical body 30 which carries at its upper end a scale pan 31 which is relatively shallow, and the lower end of this body 30 is formed with a downwardly extending loop or bail 32 which is disposed transversely to the axis of the body 30. Extending downward from the rotatable element T and associated with each pair of guide strips 12 is a hanger 33 which at its lower end pivotally supports the shank 34 of a hook 35. This shank at its free end is bent upward and then rearward to form the bill of the hook, and the shank is notched, as at 36, just rearward of the bail so as to engage with the bail 32. When this notched portion of the hook is engaged with this bail, it will be obvious that the body 30 cannot rotate on its pivot 37 in either direction. When, however, the scale beam is depressed slightly, the bail will move downward below the shoulder formed by the notch 36 and then this scale pan can freely tilt upon its pivot 37 to discharge its contents. It will be noted, of course, that the body 30 is so pivoted that the greater portion of its weight is below the pivot of this member, and hence as soon as the fruit has been discharged from the scale pan 31, the weight of the lower portion of the body will swing the body back to its vertical position and reëngage the bail or loop 32 with the hook 36.

I have illustrated a means for shifting the movable poise 29, such as illustrated and described in my prior patent before referred to though I do not wish to be limited to this. Such a means comprises a fixed, circular table T operatively supported beneath and concentric to the shaft S, upon which the rotatable element is mounted, and the upper face of this table is provided with a plurality of adjustable cams 38 arranged successively at increased distances from the axial center of the rotatable element E. The rollers 14 of the slides 13 are engaged successively by the cams whereby the slides will be gradually forced outward, thus forcing the fingers 15 and 16 outward and shifting each counter-poise 29 farther and farther toward the pivot of the scale beam. Assuming that a fruit, as for instance, an apple is upon the scale pan 31 and that this fruit is more than counter-balanced when the weight 29 is relatively near to the center of motion of the element E, then it will be obvious that as the counterweight or poise 29 is shifted inward step by step, there will come a time when the weight 29 will not counter-balance the fruit and the outer end of the beam will be depressed, causing the fruit to roll against the edge of the pan, tilt the pan and cause the discharge of the fruit, whereupon the beam will return to its normal position. It is now necessary to return the counter-poise to its initial position, that is a position relatively remote from the pivot pin 29, and to this end I have shown an elongated cam 39 positioned intermediate the inner and outer cams 38 of the series of cams and so positioned that the rollers 14 will engage the inner face of said cams 39 and be forced toward the center of the rotatable element, that is to their initial position so that the beams shall automatically assume their normal or horizontal positions after the fruit has been discharged therefrom.

I have shown the cams 38 as being mounted upon slotted bases 40 adjustably mounted upon the table T, and I have shown the cam 39 as having its inner end 41 somewhat flexible so that the position of said inner end portion may be adjusted as may be required through the medium of a slotted plate 42 and screw engaging the plate. The mechanism for shifting the slides 13 inward and outward is that shown in my prior patent before referred to, and does not form the subject of the present application. The table T also carries a series of baskets 43 having the same number as the cams 38 and designed to receive the fruit which is discharged from the several scale beams. I have illustrated these baskets 43 as being attached to the table and being in the form of shallow baskets but it is to be understood that chutes, bags or bins might be provided in place of these shallow baskets.

In Fig. 7 I show a modified form of the hook-shaped detent 35 and modified form of hanger 33. In this figure, the hanger 33ª is approximately U-shaped and is laterally divergent at its upper ends and adapted to be attached to the under face of the yoke 17. This hanger is perforated, as at 44, for the reception of the pivot pin of the hook shaped member 34ª, and is provided with an adjustable stop limiting the downward movement of this member. This stop 45 consists of a strip of metal rebent upon itself, as at 46, and at its opposite extremity being bifurcated, as at 47. A screw 48 passes through the lower end of the hanger and through the rebent portion 46 of the stop and engages a nut 49 disposed between the rebent portion of the body of the stop. A lock nut 50 is also disposed on this screw and engages against the under face of the hanger. The hook-shaped detent has a shank 34ª but at its extremity has a notch 51 on its under edge face and beyond this notch is laterally bent, as at 52. The shank 34ª is perforated at a plurality of points for the passage of a pivot pin whereby it is connected to the yoke. In this form of detent, the notch 51 engages with the bail 32 to prevent any oscillation of the bail and member 30 unless the scale beam be depressed.

The operation of this invention will be obvious from what has gone before. As the table rotates, apples are disposed one by one in the several scale pans and at this time the counter-poise 29 of each scale pan is at the position nearest the hub or center of the rotatable element. As the rotatable element moves, the counter-poise 29 of each scale pan is gradually moved inward by the cams 38 until such time as the counter-poise is moved so far toward the pivotal axis of the scale beam that the fruit will overbalance the counter-poise. The scale beam at this time tilts and as soon as it tilts, the lower end of the body 30 of the scale pan becomes released from the detent hook 35, whereupon the body with the scale beam will tilt to discharge the fruit into the appropriate and corresponding basket 43. As soon as the fruit is discharged, the beam returns to its horizontal position and the roller 14 which operatively engages the counter-poise 29 is shifted inward toward the center of motion of the rotatable element by means of the cam 39 with its inwardly extending, adjustable portion 41, and the operation is repeated. Thus, the apples or other fruit will be discharged from the scale pans at predetermined points in accordance with their weight, and thus the apples or other fruit collected in any one basket, bin or collecting member 43 will be of substantially the same weight. The tipping of the several scale beams may be very accurately regulated by adjusting the counter-poise 28 toward or from the pivot pin 24. Thus, it is possible to make these scales weigh accurately. Only a very slight tilting of the scale beam is required to release the scale pan from its engagement with the detent hook and thus permit the scale pan to tilt and discharge the apple. Thus, my device is much more rapid than that described and illustrated in my prior patent. This is important, as if any scale pan or beam drops slowly, it is liable not to discharge the fruit into the bin or receptacle intended for it, but carried to another bin or receptacle. Thus, a relatively heavy apple would be discharged in the proper bin, but an apple or other fruit which was slightly lighter in weight and which would not act upon the beam as quickly, might be carried into the next succeeding bin or receptacle.

It will be seen that this mechanism is relatively simple, and I have found it accurate in actual use. It is relatively rapid in action and is particularly intended for assorting fine grades of fruits according to weight.

While I have illustrated certain forms of my invention which I believe to be particularly effective in practice, yet I do not wish to be limited thereto, as it is obvious that many changes might be made without departing from the spirit of the appended claims.

I claim:—

1. In a weighing mechanism, a scale pan mounted for vertical movement and for limited tilting movement to discharge its contents and urged to a vertical position when the contents have been discharged, and means preventing tilting movement until the pan has descended a predetermined distance from its normal position.

2. In a weighing mechanism, a scale pan mounted for vertical movement and tipping movement under the action of a weight in the pan, and means for preventing tipping movement until the pan has descended a predetermined distance from its normal position comprising a detent operatively engaging the pan and moving vertically with the pan a limited distance.

3. In a weighing mechanism, a scale pan mounted for vertical movement and for tipping movement under the action of the material in the pan, the pan having a body extending below the fulcrum of the pan and provided with a bail, and means for preventing the tipping movement of the pan until the pan has descended a predetermined distance from its normal position comprising a pivoted member limited in its downward movement and having at its free extremity a hook engaging said bail and providing a shoulder normally engaging the bail and preventing tilting movement of the body to which the bail is attached.

4. In a weighing mechanism, a scale beam, a pan having a downwardly depending body pivoted at its upper end to the scale beam for tilting movement relative to the scale beam, and means engaging the body and preventing said tilting movement until the scale beam and body have been depressed a predetermined amount, the depending portion of the body below its pivot acting to return the body to a vertical position after the contents of the pan have been discharged.

5. A weighing mechanism including a pivoted scale beam, a pan pivotally mounted thereon for tilting movement and having a downwardly extending body, a member extending transversely with relation to the body, means for preventing tilting movement of the pan until the scale beam and pan have descended a predetermined distance comprising a pivotally supported member having at its free end a detent formed to engage with said transversely extending member, and means for limiting the downward movement of the detent carrying member but permitting the upward movement thereof.

6. A weighing mechanism including a pivoted scale beam, a pan pivotally mounted thereon for tilting movement and having a downwardly extending body, a member extending transversely of the body, means for preventing tilting movement of the pan until the scale beam and pan have descended a predetermined distance comprising a pivotally supported detent carrying member having at its free end a detent formed to engage with the transversely extending member, and adjustable means for limiting the downward movement of the detent carrying member but permitting the upward movement thereof.

7. An assorting device including a movable element, a scale beam supported by said element for rocking movement in a vertical plane, a pan pivotally mounted upon one end of said scale beam, a poise slidably engaged with the opposite portion of the beam, automatic means coacting with the poise during the travel of the element for imparting a movement to the poise in a direction toward the fulcrum of the beam, and means preventing a tilting movement of the pan until the pan has moved downward with the beam a predetermined amount.

8. An assorting machine of the character described comprising a movable element, a scale beam supported by said element for rocking movement in a vertical plane, a pan pivotally mounted upon one end of the scale beam for tilting movement, a poise slidably engaged with the opposite end portion of the beam, automatic means coacting with the poise during the travel of the element for imparting movement to the poise in a direction toward the fulcrum of the beam, automatic means for imparting reverse movement to the poise after the poise has reached its innermost position, and means preventing tilting of the pan relative to the beam until the pan and the corresponding end of the beam have descended a predetermined distance under the action of a weight in the pan.

9. An assorting machine of the character described comprising a table, an element movable relative to the table, a scale beam fulcrumed upon the element, a scale pan mounted upon one end of the scale beam, a shiftable poise mounted upon the other end portion of the scale beam, an adjustable poise mounted for longitudinal adjustment on the scale beam between the fulcrum of the beam and the scale pan, coacting means carried by the movable element and the table for imparting movement to the poise in a direction toward the fulcrum of the beam as the movable element moves relative to the table.

10. A mechanism of the character described comprising a table, an element rotatably supported thereby and provided with a plurality of radially disposed pairs of parallel guides, a slide supported by each pair of guides, a member depending from each side, a plurality of tiltable scale beams carried by the rotatable element and associated with each slide, a scale pan tiltably mounted upon one end of the scale beam, a poise slidably engaged with the opposite end portion of each beam, means carried by the corresponding slide and coacting with the poise for moving said poise longitudinally of the beam in unison with and in the same general direction as the slide, and means carried by the table and coacting with the members depending from the several slides for imparting step by step outward movement to the slides upon a movement of the rotatable element, and a gradual inward movement of the slides away from the fulcrum of the beam to return each poise to its initial position, and means for preventing tilting movement of the scale pan until the scale pan has descended a predetermined distance under the action of a weight in the scale pan.

11. In a weighing machine, a scale pan mounted for vertical and tipping movement under the action of a weight in the pan and returning to a vertical position after the weight has been discharged, and means for preventing tipping movement until the pan has descended a predetermined distance from its normal position comprising a member mounted for limited vertical movement and moving with and operatively engaging said pan upon a downward movement of the pan from its normal position, a further downward movement of the pan beyond the limit of movement of the member permitting the tipping of the pan.

12. In a weighing machine, a scale pan mounted for vertical and tipping movement under the action of a weight in the pan and returning to a vertical position after the weight has been discharged, and means for preventing tipping movement until the pan has descended a predetermined distance from its normal position comprising a member mounted for limited vertical movement and moving with and operatively engaging said pan upon a downward movement of the pan from its normal position, a further downward movement of the pan beyond the limit of movement of the member permitting the tipping of the pan, the return of the pan to a vertical position reëngaging the pan operatively with said member.

13. In a weighing mechanism, a scale beam, a scale pan pivotally mounted thereon for tipping movement under a load, means resisting said tipping movement and tending to return the pan to a normal position, and means holding the pan from tipping movement until the beam has lowered a predetermined distance, the pan and said holding means becoming reëngaged upon the return of the pan to its normal horizontal position.

14. In a weighing mechanism, a scale beam, a scale pan pivotally mounted thereon for tipping movement under a load, means resisting said tipping movement and tending to return the pan to a normal position, and means holding the pan from tipping movement until the beam has lowered a predetermined distance, the pan and said holding means becoming reëngaged upon the return of the pan to its normal horizontal position, and means for adjusting the point at which said holding means will release the pan.

15. In a weighing machine, a scale pan mounted for vertical and tipping movement under the action of a weight in the pan, and means for preventing tipping movement until the pan has descended a predetermined distance from its normal position comprising a detent operatively engaging the pan and moving downward therewith, and means for adjustably limiting the downward movement of said detent to thereby adjust the point at which said pan shall tip.

16. In a weighing machine, a scale pan mounted for vertical movement and for tipping movement under the action of the material in the pan, weight means constantly urging the pan to a horizontal position, means for preventing the tipping movement of the pan until the pan has descended a predetermined distance from its normal position comprising a vertically movable member operatively engaging the pan while moving with the same, and means for limiting the downward movement of said member to permit the pan to descend beyond said member to thereby become disengaged therefrom and tipped under the action of the load.

17. In a weighing mechanism, a pivoted scale beam, a scale pan pivotally mounted upon the scale beam for tilting movement but weighted to return to its horizontal position after discharging a load, a pivoted, vertically movable member normally engaging said pan to prevent its tilting movement and movable with the pan upon a downward movement of the scale beam and pan, and adjustable means for limiting the downward movement of the pivoted member to thereby permit the further downward movement of the scale pan to disengage the scale pan from the pivoted member and permit the scale pan to tip, said adjustable means comprising a movable stop disposed below said member, and a screw engaging said stop to adjust it vertically.

In testimony whereof I hereunto affix my signature.

BENJAMIN F. TUSSING.